(12) United States Patent
Sekigawa

(10) Patent No.: US 7,487,275 B2
(45) Date of Patent: Feb. 3, 2009

(54) SIGNAL PROCESSING SYSTEM AND ROUTING SWITCHER METHOD FOR MANAGING THE VALIDITY OF COMPUTER TERMINAL NUMBERS

(75) Inventor: Kaoru Sekigawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 303 days.

(21) Appl. No.: 11/582,263

(22) Filed: Oct. 17, 2006

(65) Prior Publication Data

US 2007/0180005 A1    Aug. 2, 2007

(30) Foreign Application Priority Data

Oct. 19, 2005    (JP)    ............ P2005-304678

(51) Int. Cl.
*G06F 13/36*    (2006.01)
*G06F 15/00*    (2006.01)
(52) U.S. Cl. .............. 710/62; 710/0; 439/74; 439/81; 708/200
(58) Field of Classification Search .......... 710/62, 710/71; 708/200; 439/74, 81
See application file for complete search history.

(56) References Cited

U.S. PATENT DOCUMENTS 5,224,866 A * 7/1993 Nakamura et al. ............ 439/81
5,813,871 A * 9/1998 Grabbe et al. ............... 439/108
6,657,759 B2 * 12/2003 Muller ....................... 359/198
6,909,530 B2 * 6/2005 Muller ....................... 359/198
7,133,392 B1 * 11/2006 Way et al. .................... 370/338
2003/0013327 A1 * 1/2003 Choi ........................... 439/74

FOREIGN PATENT DOCUMENTS

JP    2004 186899    7/2004

* cited by examiner

*Primary Examiner*—Tammara Peyton
(74) *Attorney, Agent, or Firm*—Frommer Lawrence & Haug LLP; William S. Frommer

(57) ABSTRACT

A signal processing system manages terminal numbers as a whole system without being affected by exchange of substrates and performs signal processing of intended object. A control unit sequentially assigns terminal numbers to substrates in numerical order of slots of each kind and validates only terminal numbers regarding the slot where the relevant kind of substrate is inserted. Information indicating regions of different terminal numbers in a space where the number of input/output terminals are more than those of the whole system is retained corresponding to the substrate of each kind. Based on a command specifying input/output signals by the terminal numbers in the space, terminal numbers of a substrate of the kind corresponding to the region including the specified terminal numbers are obtained, and processing corresponding to the command is executed only when those terminal numbers are valid in the substrate of the kind.

7 Claims, 12 Drawing Sheets

FIG. 1A

| Input Slot (No. 1) | Video Input Substrate | Terminal Number 1–16 |
| Input Slot (No. 2) | Video Input Substrate | Terminal Number 17–32 |
| Input Slot (No. 3) | Audio Input Substrate | Terminal Number 33–64 |
| Input Slot (No. 4) | Audio Input Substrate | Terminal Number 65–96 |

FIG. 1B

| Input Slot (No. 1) | Video Input Substrate | Terminal Number 1–16 |
| Input Slot (No. 2) | Audio Input Substrate | Terminal Number 17–48 |
| Input Slot (No. 3) | Audio Input Substrate | Terminal Number 49–80 |
| Input Slot (No. 4) | Audio Input Substrate | Terminal Number 81–112 |

FIG. 8

Video Router

| | | |
|---|---|---|
| Output Slot 12 (No. 1) | Video Output Substrate 61 | Terminal Number 1-16 (Valid) |
| Output Slot 12 (No. 2) | Video Output Substrate 61 | Terminal Number 17-32 (Valid) |
| Input Slot 11 (No. 1) | Video Input Substrate 21 | Terminal Number 1-16 (Valid) |
| Input Slot 11 (No. 2) | Video Input Substrate 21 | Terminal Number 17-32 (Valid) |
| Output Slot 12 (No. 3) | | Terminal Number 33-48 (Invalid) |
| Output Slot 12 (No. 4) | | Terminal Number 49-64 (Invalid) |
| Input Slot 11 (No. 3) | | Terminal Number 33-48 (Invalid) |
| Input Slot 11 (No. 4) | | Terminal Number 49-64 (Invalid) |

FIG. 9

Audio Router

| | | |
|---|---|---|
| Output Slot 12 (No. 1) | | Terminal Number 1-32 (Invalid) |
| Output Slot 12 (No. 2) | | Terminal Number 33-64 (Invalid) |
| Input Slot 11 (No. 1) | | Terminal Number 1-32 (Invalid) |
| Input Slot 11 (No. 2) | | Terminal Number 33-64 (Invalid) |
| Output Slot 12 (No. 3) | Audio Output Substrate 71 | Terminal Number 65-96 (Valid) |
| Output Slot 12 (No. 4) | | Terminal Number 97-128 (Invalid) |
| Input Slot 11 (No. 3) | Audio Input Substrate 31 | Terminal Number 65-96 (Valid) |
| Input Slot 11 (No. 4) | | Terminal Number 97-128 (Invalid) |

FIG. 10

TC Router

| Slot | Terminal Numbers | |
|---|---|---|
| Output Slot 12 (No. 1) | Terminal Number 1-16 | (Invalid) |
| Output Slot 12 (No. 2) | Terminal Number 17-32 | (Invalid) |
| Input Slot 11 (No. 1) | Terminal Number 1-16 | (Invalid) |
| Input Slot 11 (No. 2) | Terminal Number 17-32 | (Invalid) |
| Output Slot 12 (No. 3) | Terminal Number 33-48 | (Invalid) |
| Output Slot 12 (No. 4) | Terminal Number 49-64 | (Valid) — TC Output Substrate 81 |
| Input Slot 11 (No. 3) | Terminal Number 33-48 | (Invalid) |
| Input Slot 11 (No. 4) | Terminal Number 49-64 | (Valid) — TC Input Substrate 41 |

FIG. 11

RS Router

| Slot | Terminal Numbers | |
|---|---|---|
| Output Slot 12 (No. 1) | Terminal Number 1-8 | (8:Vacant Number)(Invalid) |
| Output Slot 12 (No. 2) | Terminal Number 9-16 | (16:Vacant Number)(Invalid) |
| Input Slot 11 (No. 1) | Terminal Number 1-8 | (8:Vacant Number)(Invalid) |
| Input Slot 11 (No. 2) | Terminal Number 9-16 | (16:Vacant Number)(Invalid) |
| Output Slot 12 (No. 3) | Terminal Number 17-24 | (24:Vacant Number)(Invalid) |
| Output Slot 12 (No. 4) | Terminal Number 25-32 | (32:Vacant Number)(Invalid) |
| Input Slot 11 (No. 3) | Terminal Number 17-24 | (24:Vacant Number)(Invalid) |
| Input Slot 11 (No. 4) | Terminal Number 25-32 | (32:Vacant Number)(Invalid) |

FIG. 12

Video Router

| Slot | Substrate | Terminal Numbers |
|---|---|---|
| Output Slot 12 (No. 1) | | Terminal Number 1-16 (Invalid) |
| Output Slot 12 (No. 2) | Video Output Substrate 61 | Terminal Number 17-32 (Valid) |
| Input Slot 11 (No. 1) | | Terminal Number 1-16 (Invalid) |
| Input Slot 11 (No. 2) | Video Input Substrate 21 | Terminal Number 17-32 (Valid) |
| Output Slot 12 (No. 3) | Video Output Substrate 61 | Terminal Number 33-48 (Valid) |
| Output Slot 12 (No. 4) | | Terminal Number 49-64 (Invalid) |
| Input Slot 11 (No. 3) | Video Input Substrate 21 | Terminal Number 33-48 (Valid) |
| Input Slot 11 (No. 4) | Video Input Substrate 21 | Terminal Number 49-64 (Valid) |

FIG. 13

Audio Router

| Slot | Substrate | Terminal Numbers |
|---|---|---|
| Output Slot 12 (No. 1) | | Terminal Number 1-32 (Invalid) |
| Output Slot 12 (No. 2) | Audio Output Substrate 71 | Terminal Number 33-64 (Valid) |
| Input Slot 11 (No. 1) | | Terminal Number 1-32 (Invalid) |
| Input Slot 11 (No. 2) | Audio Input Substrate 31 | Terminal Number 33-64 (Valid) |
| Output Slot 12 (No. 3) | Audio Output Substrate 71 | Terminal Number 65-95 (Valid) |
| Output Slot 12 (No. 4) | | Terminal Number 97-128 (Invalid) |
| Input Slot 11 (No. 3) | Audio Input Substrate (UB) 32 | Terminal Number 65-95 (81-95:Vacant Number) (Valid) |
| Input Slot 11 (No. 4) | Audio Input Substrate 31 | Terminal Number 97-128 (Valid) |

FIG. 14

RS Router

| | |
|---|---|
| Output Slot 12 (No. 1) | Terminal Number 1-8 ( 8:Vacant Number) (Invalid) |
| Output Slot 12 (No. 2) RS-422 Substrate 51 | Terminal Number 9-16 (16:Vacant Number) (Valid) |
| Input Slot 11 (No. 1) | Terminal Number 1-8 ( 8:Vacant Number) (Invalid) |
| Input Slot 11 (No. 2) RS-422 Substrate 51 | Terminal Number 9-16 (16:Vacant Number) (Valid) |
| Output Slot 12 (No. 3) RS-422 Substrate 51 | Terminal Number 17-24 (24:Vacant Number) (Valid) |
| Output Slot 12 (No. 4) | Terminal Number 25-32 (32:Vacant Number) (Invalid) |
| Input Slot 11 (No. 3) RS-422 Substrate 51 | Terminal Number 17-24 (24:Vacant Number) (Valid) |
| Input Slot 11 (No. 4) RS-422 Substrate 51 | Terminal Number 25-32 (32:Vacant Number) (Valid) |

US 7,487,275 B2

SIGNAL PROCESSING SYSTEM AND ROUTING SWITCHER METHOD FOR MANAGING THE VALIDITY OF COMPUTER TERMINAL NUMBERS

CROSS REFERENCES TO RELATED APPLICATIONS

The present invention contains subject matter related to Japanese Patent Application JP 2005-304678 filed in the Japanese Patent Office on Oct. 19, 2005, the entire contents of which being incorporated herein by reference.

BACKGROUND OF THE INVENTION

1. Field of the Invention

The present invention relates to a system (for example, routing switcher) in which signal input substrates varying in the number of input terminals and signal output substrates varying in the number of output terminals are inserted into and removed from a plurality of slots.

2. Description of the Related Art

Japanese Patent Application Publication No. 2004-186899 (paragraphs 0067 through 0081 and FIG. 5) discloses a signal switching apparatus called a routing switcher (or router). When broadcasting and recording a program in a broadcasting station, video signals/audio signals from a large number of video cameras and microphones in a studio and a coverage site, video signals/audio signals reproduced by VTR and the like are all input into the router. Input signals to be output to devices (program transmission device, editing terminal, VTR and the like) are switched by the router.

In the past, a plurality of devices used for different purposes such as the followings have been used as the router:
(i) a device that inputs/outputs video signals (video router);
(ii) a device that inputs/outputs audio signals (audio router);
(iii) a device that inputs/outputs time codes added to video signals/audio signals; and
(iv) a device that inputs/outputs signals to control devices.

Further, a router enabling various kinds of signals such as a video signal, audio signal and time code to be input/output by a single device, which is called a hybrid router, has also been introduced.

The hybrid router is configured to have a plurality of input slots and output slots. An arbitrary substrate among a video signal input substrate, an audio signal input substrate, a time code input substrate and the like is inserted into and removed from each of input slots. Similarly, an arbitrary substrate among a video signal output substrate, an audio signal output substrate, a time code output substrate and the like is inserted into and removed from each of output slots.

SUMMARY OF THE INVENTION

Regarding such router, there is a method of deciding the number of input terminals of individual input substrates and deciding the number of output terminals of individual output substrates, in which the number of terminals is fixed regardless of the kind of signal. Here, the input terminals are terminals to which signals from a video camera, a microphone and the like are input, being on the side opposite to a connector connected to an input slot, and the output terminals are terminals from which signals are output to a program transmission device, an editing terminal device and the like, being on the side opposite to a connector connected to the output slot.

Since a transmission band of an audio signal is narrow in comparison to that of a video signal, audio signals of more channels can be input/output using one router with the number of input terminals and output terminals of the audio signal input substrate and audio signal output substrate more than that of the video signal input substrate and video signal output substrate.

However, when the number of input terminals of the input substrate and the number of output terminals of the output substrate differ depending on the kind of signal as described above, there may be a disadvantage regarding management of terminal numbers of the router as a whole (that is, management of channel numbers of input/output signals).

Specifically, in the case where terminal numbers are sequentially assigned to the input terminals of the input substrate inserted into each input slot in numerical order of input slots and terminal numbers are sequentially assigned to the output terminals of the output substrate inserted into each output slot in numerical order of output slots, for example, when a substrate in a slot is replaced with a substrate of another kind of signal, the terminal numbers of subsequent slots may be changed as shown in FIGS. 1A and 1B.

In a state of FIG. 1A, video input substrates (the number of terminals are sixteen each) are inserted into input slots of slot numbers No. 1 and No. 2, and audio input substrates (the number of terminals are thirty-two each) are inserted into input slots of slot numbers No. 3 and No. 4. In such state, terminal numbers 1 through 16 are assigned to input terminals of the video input substrate in the input slot of slot number No. 1. Terminal numbers 17 through 32 are assigned to input terminals of the video input substrate in the input slot of slot number No. 2. Terminal numbers 33 through 64 are assigned to input terminals of the audio input substrate in the input slot of slot number No. 3. Terminal numbers 65 through 96 are assigned to input terminals of the audio input substrate in the input slot of slot number No. 4.

In a state of FIG. 1B, the video input substrate in the input slot of slot number No. 2 is replaced with an audio input substrate from the state of FIG. 1A. In this state, since the terminal numbers of the input terminals of the audio input substrate in the input slot of slot number No. 2 become 17 through 48, the terminal numbers of the input terminals of the audio input substrate in the input slot of slot number No. 3 change to 49 through 80 and the terminal numbers of the input terminals of the audio input substrate in the input slot of slot number No. 4 change to 81 through 112.

When a router is being used, respective input terminals of the input substrate and output terminals of the output substrate in each slot are physically connected to specific devices (video camera, microphone, program transmission device, editing terminal device and the like). Further, a signal to be switched is specified based on the terminal numbers of the input terminal and output terminal in a command that instructs the router to perform switching. Therefore, when the terminal numbers are changed in the middle of operation as shown in the example of FIGS. 1A and 1B, an input signal originally intended to output to a certain device may not be output to the intended device.

In view of the above, the inventor of the present invention has recognized a need for managing terminal numbers as a whole system in order to process a signal originally intended to be processed. The terminal numbers can be managed without being affected by exchange of substrates in a system such as the hybrid router in which two or more kinds of signal input substrates and signal output substrates differing in the number of input terminals and the number of output terminals are inserted into and removed from a plurality of slots.

According to an embodiment of the present invention, there is provided a signal processing system including a plurality of input slots and/or output slots, in which two or more kinds of signal input substrates differing in the number of input terminals and/or two or more kinds of signal output substrates differing in the number of output terminals can be inserted into and removed from each of the input slots and/or output slots. The signal processing system includes a first processing unit, a second processing unit and a third processing unit as described below. The first processing unit sequentially assigns terminal numbers to the input terminals and/or output terminals in numerical order of input slots and/or output slots for the signal input substrates and/or signal output substrates of each kind, and treats the terminal numbers as valid terminal numbers regarding the input slot and/or output slot where the relevant kind of substrate is inserted and treats the terminal numbers as invalid terminal numbers regarding the input slot and/or output slot where the relevant kind of substrate is not inserted. The second processing unit retains information indicating regions of different terminal numbers in a space where the number of input terminals and/or the number of output terminals are more than those of the whole system, corresponding to the signal input substrate and/or signal output substrate of each kind. The third processing unit, upon receiving a command specifying an input signal and/or output signal by terminal numbers in the space and using the information retained in the second processing unit, converts the specified terminal numbers into the terminal numbers of the input terminal and/or output terminal in the signal input substrate and/or signal output substrate of the kind corresponding to the region including the relevant terminal numbers. In addition, the third processing unit judges whether the converted terminal numbers are treated as the valid terminal numbers by the first processing unit. Then, the signal processing system executes processing corresponding to the command only in the case where it is judged that the converted terminal numbers are treated as the valid terminal numbers by the first processing unit.

Further, according to another embodiment of the present invention, there is provided a method of managing terminal numbers in a signal processing system including a plurality of input slots and/or output slots, in which two or more kinds of signal input substrates differing in the number of input terminals and/or two or more kinds of signal output substrates differing in the number of output terminals can be inserted into and removed from each of the input slots and/or output slots. The method of managing the terminal numbers includes a first step, a second step, a third step and a fourth step as described below. At the first step, terminal numbers are sequentially assigned to the input terminals and/or output terminals in numerical order of input slots and/or output slots for the signal input substrates and/or signal output substrates of each kind. Further, terminal numbers regarding the input slot and/or output slot where the relevant kind of substrate is inserted are treated as valid terminal numbers, and terminal numbers regarding the input slot and/or output slot where the relevant kind of substrate is not inserted are treated as invalid terminal numbers. At the second step, information indicating regions of different terminal numbers in a space where the number of input terminals and/or the number of output terminals are more than those of the whole system is retained corresponding to the signal input substrate and/or signal output substrate of each kind. At the third step, upon receiving a command specifying an input signal and/or output signal by terminal numbers in the space and using the information retained at the second step, the specified terminal numbers are converted into the terminal numbers of the input terminal and/or output terminal in the signal input substrate and/or signal output substrate of the kind corresponding to the region including the relevant terminal numbers. In addition, it is judged at the third step whether the converted terminal numbers are treated as the valid terminal numbers at the first step. At the fourth step, processing corresponding to the command is executed only in the case where it is judged that the converted terminal numbers are treated as the valid terminal numbers at the third step.

In the above-described signal processing system and the method of managing the terminal numbers thereof according to the embodiments, the system is configured such that the two or more kinds of signal input substrates differing in the number of input terminals are inserted into and removed from the plurality of input slots and the two or more kinds of signal output substrates differing in the number of output terminals are inserted into and removed from the plurality of output slots. In addition, the terminal numbers are sequentially assigned to respective signal input substrates and signal output substrates of each kind in numerical order of input slots and output slots, and only the terminal numbers regarding the slot where the relevant kind of substrate is inserted are treated as valid terminal numbers. In other words, there is provided the system in which independent terminal-number systems are virtually set for respective substrates of each kind within one system.

In the case where a substrate inserted into a certain slot is replaced with another kind of substrate, only the management of whether the terminal numbers are valid/invalid changes without changing the terminal numbers in those virtual systems. Therefore, the terminal numbers remain unchanged after replacing substrates in the system.

Further, the information indicating the regions of different terminal numbers in the space where the number of input terminals and the number of output terminals are more than those of the whole system is retained corresponding to the substrate of each kind (specifically, corresponding to each virtual system) in the system. Therefore, no terminal numbers of respective virtual systems overlap with each other in the space.

Further, based on receiving the command specifying the input signal and output signal by terminal numbers in the space and using the information, the specified terminal numbers are converted into the terminal numbers of the virtual system corresponding to the region including the relevant terminal numbers. Then, the processing corresponding to the command is executed only in the case where the converted terminal numbers are treated as the valid terminal numbers in the virtual system. Specifically, only in the case where the converted terminal numbers are the terminal numbers regarding the slot where the substrate of the kind in the virtual system is inserted, the command is executed.

Accordingly, the terminal numbers can be managed as the whole system and the signal originally intended to be processed can be processed without being affected by the exchange of substrates.

Next, according to further embodiment of the present invention, there is provided a routing switcher including plurality of input slots and output slots respectively, in which two or more kinds of signal input substrates differing in the kind of input signal and differing in the number of input terminals and two or more kinds of signal output substrates differing in the kind of output signal and differing in the number of output terminals can be inserted into and removed from each of the input slots and output slots, respectively. The routing switcher includes a first processing means, a second processing means and a third processing means as described below. The first processing means sequentially assigns terminal numbers to respective signal input substrates of each kind in numerical order of input slots and treats terminal numbers as valid terminal numbers regarding the input slot where the relevant kind of signal input substrate is inserted and treats terminal numbers as invalid terminal numbers regarding the slot where the relevant kind of signal input substrate is not inserted. Further, the first processing means sequentially assigns terminal numbers to respective signal output substrates of each kind in numerical order of output slots and treats terminal numbers as valid terminal numbers regarding the output slot where the relevant kind of signal output substrate is inserted and treats terminal numbers as invalid terminal numbers regarding the slot where the relevant kind of signal output substrate is not inserted. The second processing means retains information indicating regions of different terminal numbers in a space where the number of input terminals and the number of output terminals are more than those of the whole routing switcher, corresponding to the signal input substrate and signal output substrate of each kind. The third processing means, upon receiving a command specifying an input signal and output signal by terminal numbers in the space and using the information retained in the second processing means, converts the specified terminal numbers respectively into the terminal numbers of the input terminal and output terminal in the signal input substrate and signal output substrate of the kind corresponding to the region including the relevant terminal numbers. Also, the third processing means judges whether the converted terminal numbers are treated as the valid terminal numbers by the first processing means. Further, the routing switcher executes processing corresponding to the command only in the case where it is judged that the converted terminal numbers are treated as the valid terminal numbers by the first processing means.

Furthermore, according to still another embodiment of the present invention, there is provided a method of managing terminal numbers in a routing switcher including plurality of input slots and output slots respectively, in which two or more kinds of signal input substrates differing in the kind of input signal and differing in the number of input terminals and two or more kinds of signal output substrates differing in the kind of output signal and differing in the number of output terminals can be inserted into and removed from each of the input slots and output slots, respectively. The method of managing the terminal numbers in the routing switcher includes a first step, a second step, a third step and a fourth step as described below. At the first step, terminal numbers are sequentially assigned to respective signal input substrates of each kind in numerical order of the input slots and terminal numbers regarding the input slot where the relevant kind of signal input substrate is inserted are treated as valid terminal numbers and terminal numbers regarding the slot where the relevant kind of signal input substrate is not inserted are treated as invalid terminal numbers. Further at the first step, terminal numbers are sequentially assigned to respective signal output substrates of each kind in numerical order of the output slots and terminal numbers regarding the output slot where the relevant kind of signal output substrate is inserted are treated as valid terminal numbers and terminal numbers regarding the slot where the relevant kind of signal output substrate is not inserted are treated as invalid terminal numbers. At the second step, information indicating regions of different terminal numbers in a space where the number of input terminals and the number of output terminals are more than those of the whole routing switcher is retained corresponding to the signal input substrate and signal output substrate of each kind. At the third step, upon receiving a command specifying an input signal and output signal by terminal numbers in the space and using the information retained at the second step, the specified terminal numbers are respectively converted into the terminal numbers of the input terminal and output terminal in the signal input substrate and signal output substrate of the kind corresponding to the region including the relevant terminal numbers. In addition, it is judged at the third step whether the converted terminal numbers are treated as the valid terminal numbers at the first step. At the fourth step, processing corresponding to the command is executed only in the case where it is judged that the converted terminal numbers are treated as the valid terminal numbers at the third step.

In the above-described routing switcher and the method of managing the terminal numbers thereof according to the embodiments, the signal input and/or signal output system and the method of managing the terminal numbers thereof according to the embodiments of the present invention are specified as the routing switcher (that is a hybrid router in which the number of input terminals of the signal input substrate and the number of output terminals of the signal output substrate differ depending on the kind of signal). The terminal numbers can be managed as a whole router without being affected by the exchange of signal input substrates and signal output substrates, and the input signal originally intended to be output to a certain device can be output to the intended device.

According to the signal processing system and the method of managing the terminal numbers of the embodiments, there is provided a system in which two or more kinds of signal input substrates differing in the number of input terminals are inserted into and removed from the plurality of input slots and two or more kinds of signal output substrates differing in the number of output terminals are inserted into and removed from the plurality of output slots. The terminal numbers can be managed as a whole system without being affected by the exchange of substrates, enabling the originally intended signal to be processed.

According to the routing switcher and the method of managing the terminal numbers of the embodiments, there is provided a routing switcher (that is the hybrid router in which the number of input terminals of the signal input substrate and the number of output terminals of the signal output substrate differ depending on the kind of signal) including a plurality of input slots and output slots, respectively. The routing switcher is configured such that two or more kinds of signal input substrates differing in the kind of input signal and differing in the number of input terminals and two or more kinds of signal output substrates differing in the kind of output signal and differing in the number of output terminals can be inserted into and removed from each of the input slots and output slots. In the routing switcher, the terminal numbers can be managed as a whole router without being affected by the exchange of signal input substrates and signal output substrates, and the input signal originally intended to be output to a certain device can be output to the intended device.

BRIEF DESCRIPTION OF THE DRAWINGS

FIGS. 1A and 1B are diagrams showing an example of the change in terminal numbers due to exchange of substrates in a routing switcher of related art;

FIG. 8 is a diagram showing an example of terminal-number assigning processing according to an embodiment of the present invention;

FIG. 9 is a diagram showing an example of terminal-number assigning processing according to an embodiment of the present invention;

FIG. 10 is a diagram showing an example of terminal-number assigning processing according to an embodiment of the present invention;

FIG. 11 is a diagram showing an example of terminal-number assigning processing according to an embodiment of the present invention;

FIG. 12 is a diagram showing an example of terminal-number assigning processing according to an embodiment of the present invention;

FIG. 13 is a diagram showing an example of terminal-number assigning processing according to an embodiment of the present invention;

FIG. 14 is a diagram showing an example of terminal-number assigning processing according to an embodiment of the present invention.

DESCRIPTION OF THE PREFERRED EMBODIMENTS

Figure 2:
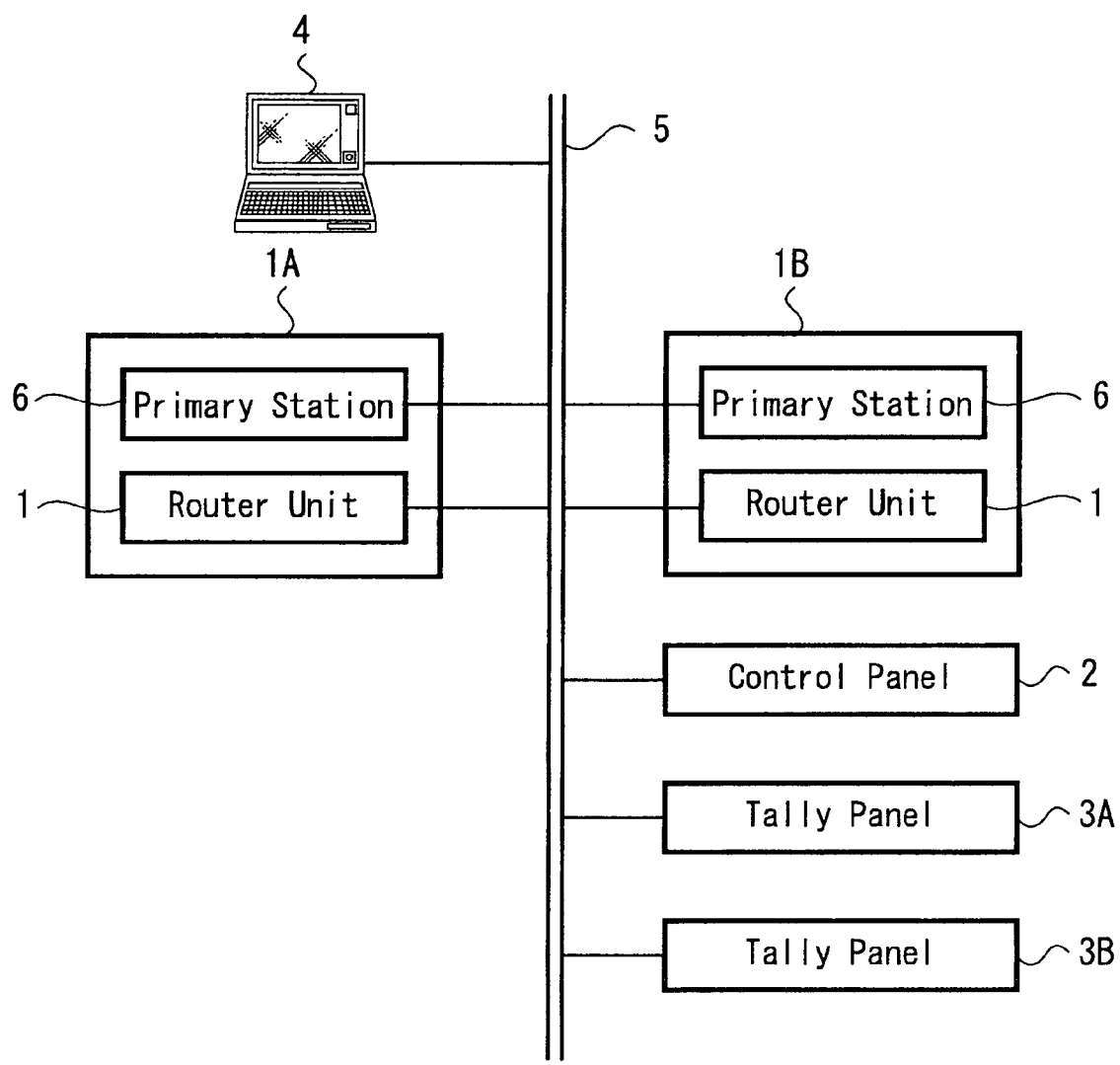
FIG. 2 is a diagram showing an example of the whole configuration of a signal switching system including a routing switcher to which an embodiment of the present invention is applied.

Hereinafter, a routing switcher according to an embodiment of the present invention is specifically explained using accompanied drawings. FIG. 2 is a diagram showing an example of an overall configuration of a signal switching system for video/audio signals and the like in a broadcasting station, including a routing switcher to which an embodiment of the present invention is applied.

In the aforementioned signal switching system, two routing switchers 1A and 1B, a control panel 2, two tally panels 3A and 3B, and a terminal computer 4 are mutually connected by a communication path 5 such as Ethernet®, for example.

The routing switcher 1A and the routing switcher 1B have the same configuration. Each of those routing switchers is a combined station including a primary station 6 and a router unit 1 being a secondary station ("primary station" and "secondary station" are explained in the followings).

The control panel 2 being a secondary station is a control device to perform operation of switching the routing switchers 1A and 1B.

The tally panels 3A and 3B being secondary stations are display devices to display respectively a switching state of input/output signals (for example, a name which is set to an output signal line from which an input signal into a specific input signal line being a reference is output) in the routing switchers 1A and 1B.

The terminal computer 4 is a computer to perform various setting operations with respect to the whole signal switching system.

Here, the primary station is a device to receive the setting result data from the terminal computer 4, to transmit the setting result data and command to the secondary station and to transmit data to and receive data from the secondary station, managing the whole signal switching system.

Communication is not directly performed between secondary stations but data are mutually transmitted and received through the primary station. Specifically, when a switching operation is performed with respect to the routing switcher 1A on the control panel 2, for example, a command corresponding to the content of that operation is sent from the control panel 2 to the primary station. Then, the command is sent from the primary station to the router unit 1 of the routing switcher 1A, causing the switching state of input/output signals to be changed in the routing switcher 1A.

After that, a status showing the new switching state is sent from the router unit 1 to the primary station. Further, the status is sent from the primary station to the tally panel 3A, causing the switching state of input/output signals in the routing switcher 1A is displayed on the tally panel 3A.

Only one primary station is used within one signal switching system. Here, in this signal switching system, the primary station 6 in the routing switcher 1A, for example, is used as the primary station and the routing switcher 1B is used only as the secondary station (only the router unit 1 is used without using the primary station 6).

Figure 3:
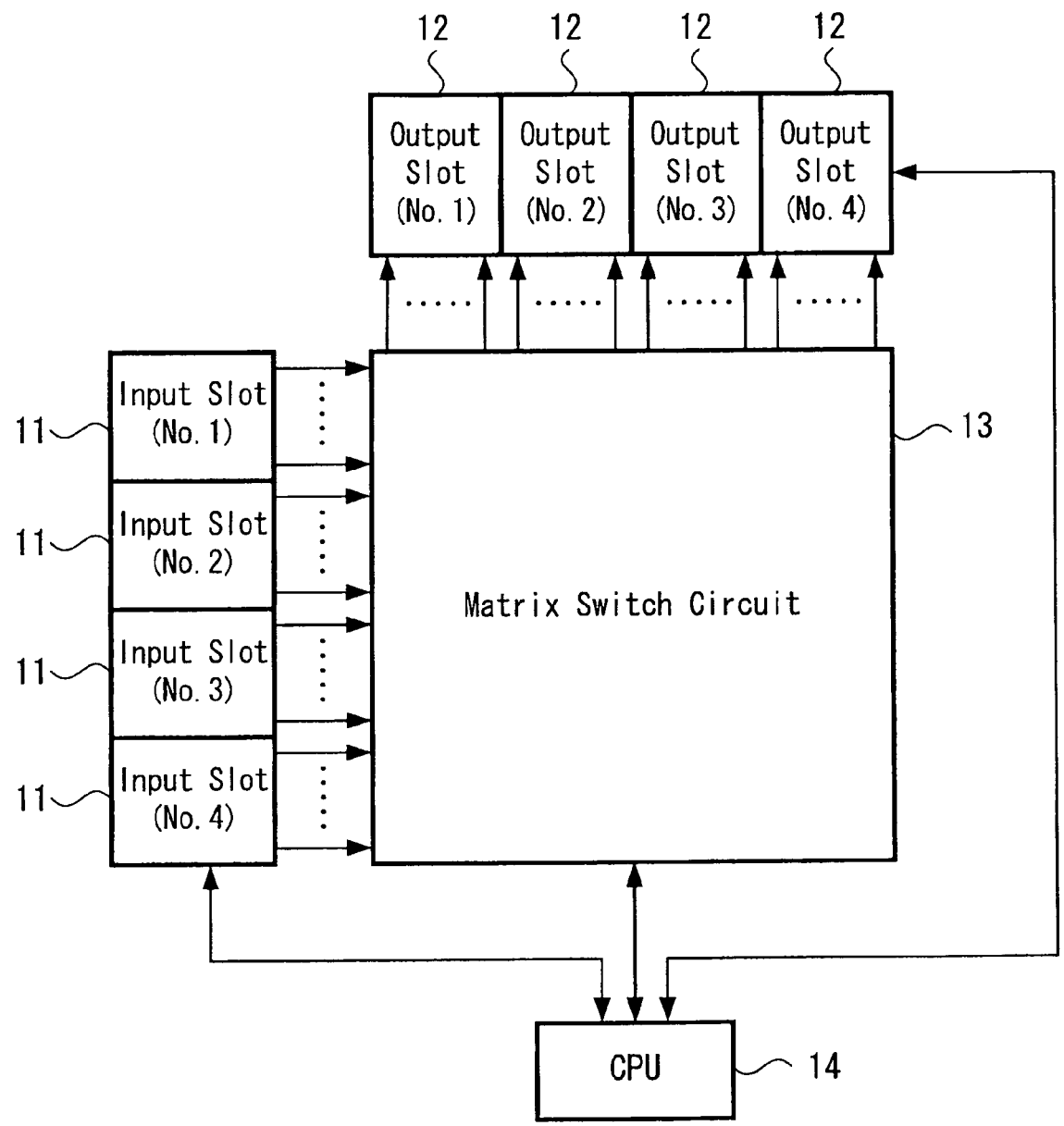
FIG. 3 is a diagram showing a configuration of a router unit in the routing switcher in FIG. 2.

FIG. 3 is a diagram showing a configuration of the router unit 1 in each of the routing switchers 1A and 1B (hereinafter, the router unit 1 is called "router 1" as simplified). The router 1 includes four input slots 11 (slot numbers are No. 1 through No. 4), four output slots 12 (slot numbers are No. 1 through No. 4), a matrix switch circuit 13 and a CPU 14.

Each input slot 11 is a slot for inserting and removing an arbitrary substrate among the following four kinds of substrates:

(i) substrate for video signal input (hereinafter, called video input substrate);

(ii) substrate for audio signal input (hereinafter, called audio input substrate);

(iii) substrate for inputting time code added to video/audio signals (hereinafter, called TC input substrate); and (iv) substrate for controlling devices to which video signal/audio signal are output, using RS-422 being one of serial communication standards (hereinafter, called RS-422 substrate).

Figure 4:
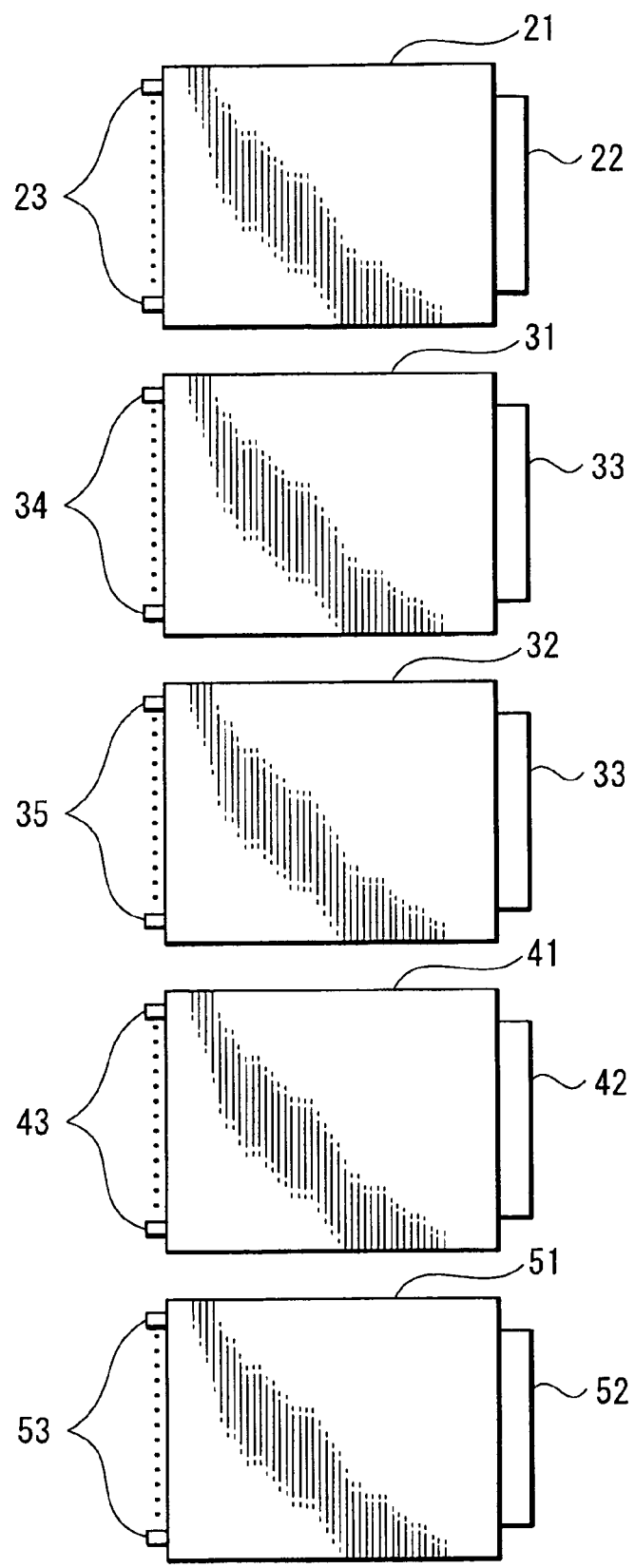
FIG. 4 is a diagram showing terminals of various substrates for input slots in FIG. 3.

FIG. 4 is a diagram schematically showing terminals and connectors provided in those substrates. A video input substrate 21 has a connector 22 connected to the input slot 11 and has sixteen input terminals 23 on the opposite side in order to input a video signal from a video camera, VTR and the like. The connector 22 is provided with sixteen pins, and the video signal input into each input terminal 23 is output from a separate pin of the connector 22, respectively.

Regarding an audio input substrate, there are two kinds of substrates which are an audio input substrate 31 and an audio input substrate (UB) 32. The audio input substrate 31 has a connector 33 connected to the input slot 11 and has thirty-two XLR input terminals 34 on the opposite side in order to input an audio signal from a video camera, microphone and the like. The connector 33 is provided with sixteen pins, and the audio signals input into every two input terminals 34 are time-divisionally multiplexed in the audio input substrate 31 to be output from each pin of the connector 33.

The audio input substrate (UB) 32 has a connector 33 (that has the same structure as the connector 33 of the audio input substrate 31) connected to the input slot 11 and has sixteen BNC input terminals 35 on the opposite side in order to input an audio signal from a video camera, microphone and the like. The audio signal input into each input terminal 35 is output from a separate pin of the connector 33. "UB" of the audio input substrate (UB) 32 is the abbreviation for unbalance and shows that the substrate uses an unbalanced BNC input terminal.

A TC input substrate 41 has a connector 42 connected to the input slot 11 and has sixteen input terminals 43 on the opposite side in order to input a time code. The connector 42 is provided with sixteen pins, and the time code input into each input terminal 43 is respectively output from a separate pin of the connector 42.

An RS-422 substrate 51 has a connector 52 connected to the input slot 11 and has sixteen input/output terminals 53 on the opposite side in order to input/output a control signal. Eight of the terminals 53 are input terminals and the remaining eight are output terminals. However, one of the input terminals and one of the output terminals in the terminal 53 are not used due to a relation regarding an arrangement of the substrate and terminals and the like, and therefore seven of the input terminals and output terminals can be used.

The connector 52 is provided with sixteen pins, eight of which are reception pins and the remaining eight of which are transmission pins. Signals input into the usable seven input terminals 53 are respectively output from separate reception pins of the connector 52. The signals input into seven pins among the transmission pins of the connector 52 are output from separate terminals among the usable seven output terminals 53.

Each output slot 12 of FIG. 3 is a slot for inserting and removing an arbitrary substrate among the following four kinds of substrates:

(i) substrate for video signal output (hereinafter, called video output substrate);
(ii) substrate for audio signal input (hereinafter, called audio output substrate);
(iii) substrate for outputting time code (hereinafter, called TC output substrate); and
(iv) RS-422 substrate 51 shown in FIG. 4.

Figure 5:
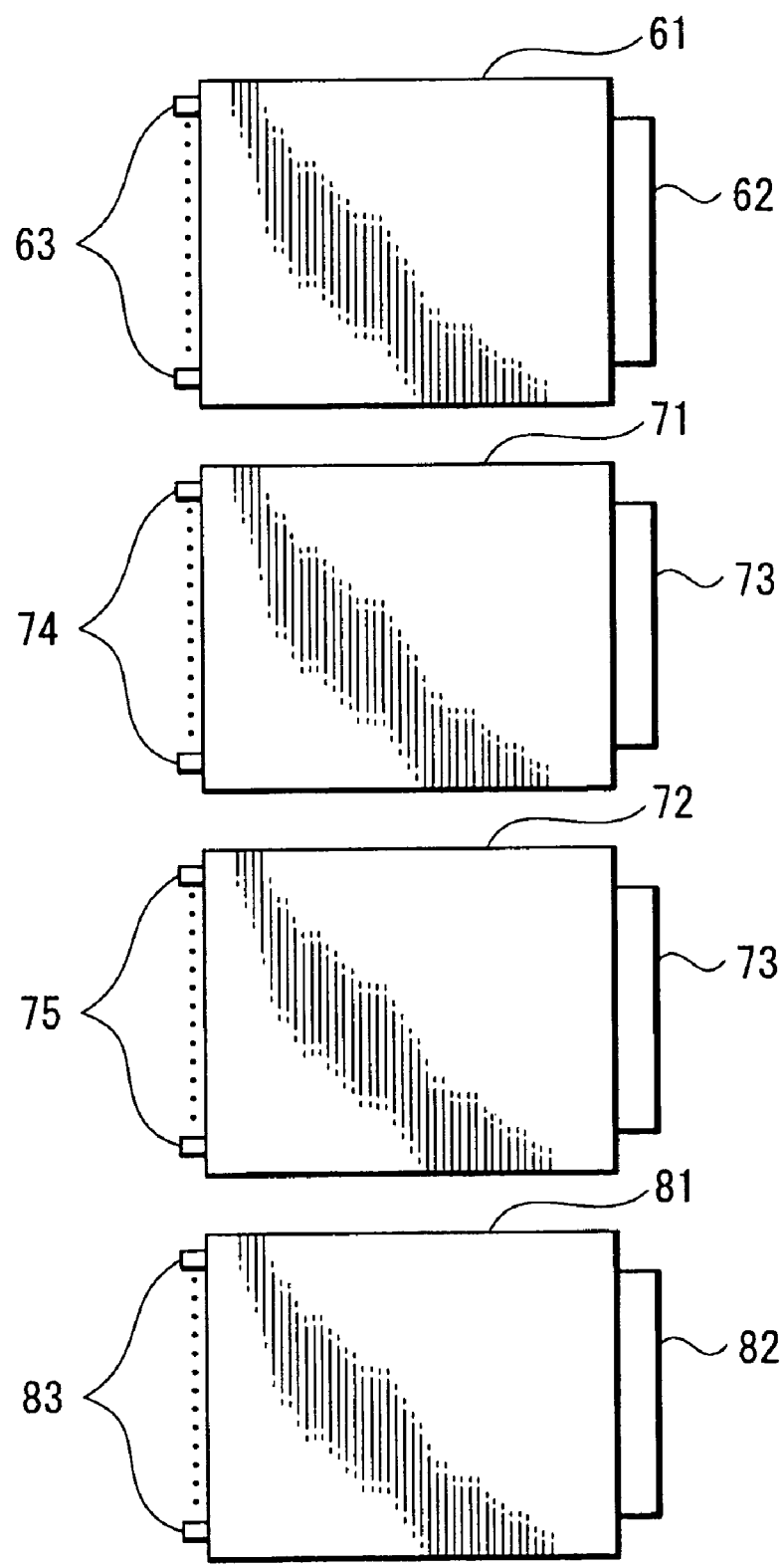
FIG. 5 is a diagram showing terminals of various substrates for output slots in FIG. 3.

FIG. 5 is a diagram schematically showing terminals and connectors provided in the video output substrate, audio output substrate and TC output substrate. A video output substrate 61 has a connector 62 connected to the output slot 12 and has sixteen output terminals 63 on the opposite side in order to output a video signal to a program transmission device, editing terminal device and the like. The connector 62 is provided with sixteen pins, and the video signal input into each pin of the connector 62 is output from a separate output terminal 63, respectively.

Regarding an audio output substrate, there are two kinds of substrates which are an audio output substrate 71 and an audio output substrate (UB) 72. The audio output substrate 71 has a connector 73 connected to the output slot 12 and has thirty-two XLR output terminals 74 on the opposite side in order to output an audio signal to a program transmission device, editing terminal device and the like. The connector 73 is provided with sixteen pins, and the audio signal (time-divisionally multiplexed signal) input into each pin of the connector 73 is separated into audio signals of two channels in the audio output substrate 71 and those audio signals are output respectively from every two of the output terminals 74.

The audio output substrate (UB) 72 has a connector 73 (that has the same structure as the connector 73 of the audio output substrate 71) connected to the output slot 12 and has sixteen BNC output terminals 75 on the opposite side in order to output an audio signal to a program transmission device, editing terminal device and the like. The audio signal input into each pin of the connector 73 is respectively output from a separate output terminal 75. "UB" of the audio output terminal (UB) 72 is the abbreviation for unbalance and shows that the substrate uses an unbalanced BNC input terminal.

A TC output substrate 81 has a connector 82 connected to the output slot 12 and has sixteen output terminals 83 on the opposite side in order to output a time code. The connector 82 is provided with sixteen pins, and the time code input into each pin of the connector 82 is respectively output from a separate output terminal 83.

Figure 6:
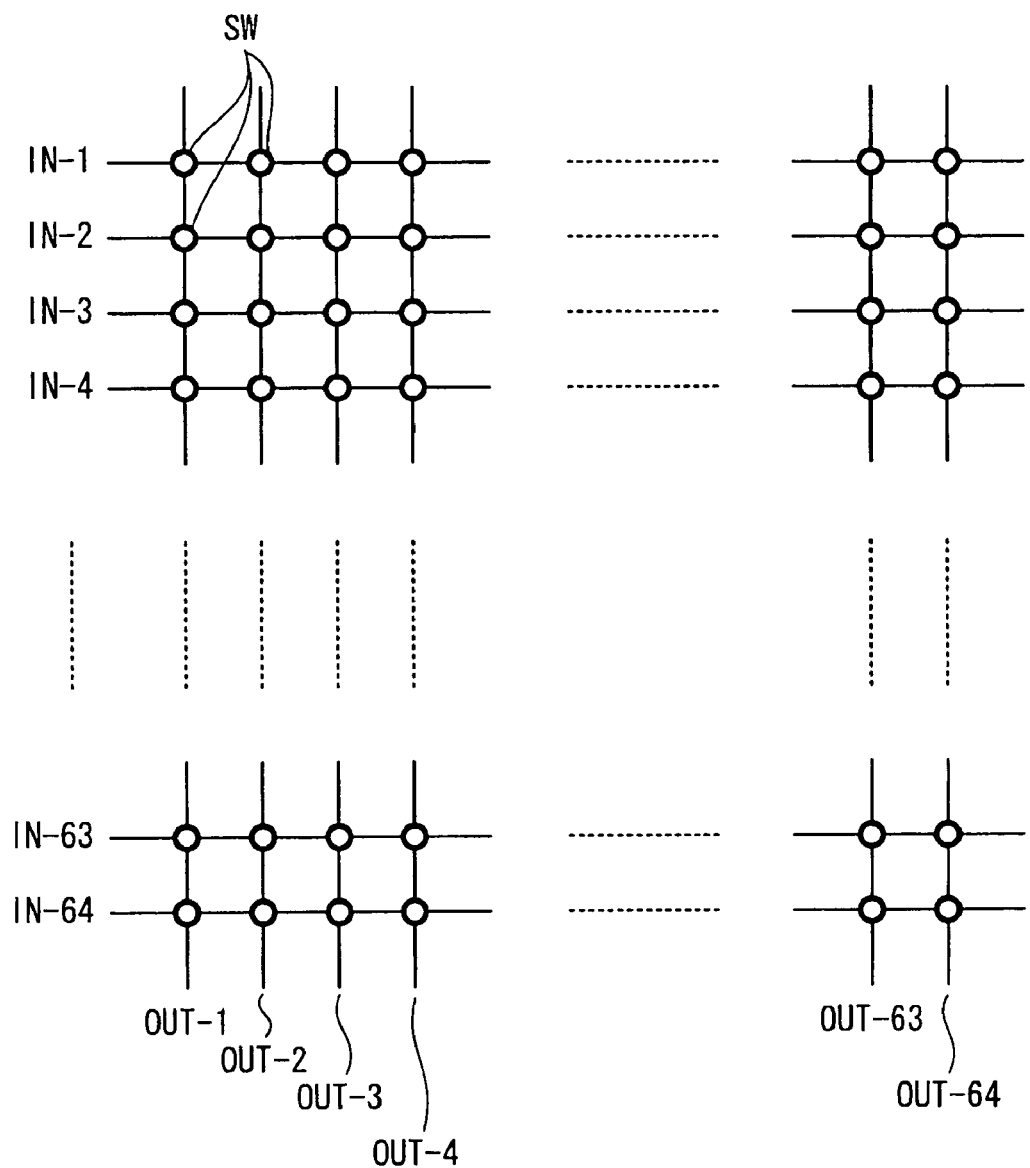
FIG. 6 is a diagram showing a configuration of a matrix switch circuit in FIG. 3.

As shown in FIG. 6, the matrix switch circuit 13 in FIG. 3 is configured such that sixty-four input signal lines IN-1 through IN-64 and sixty-four output signal lines OUT-1 through OUT-64 are intersected on a single substrate and a connecting switch SW made of a semiconductor element is provided at each crossing point.

Signals output from the sixteen pins of a connector of a substrate inserted into the input slot 11 of slot number No. 1 are input into the input signal lines IN-1 through IN-16 among the input signal lines IN-1 through IN-64. The connector is any one of the connector 22 of the video input substrate 21, the connector 33 of the audio input substrate 31, the connector 33 of the audio input substrate (UB) 32, the connector 42 of the TC input substrate 41, and the connector 52 of RS-422 substrate 51, which are shown in FIG. 4.

Signals output from the sixteen pins of a connector of a substrate inserted into the input slot 11 of slot number No. 2 are input into the input signal lines IN-17 through IN-32. Signals output from the sixteen pins of a connector of a substrate inserted into the input slot 11 of slot number No. 3 are input into the input signal lines IN-33 through IN-48. Signals output from the sixteen pins of a connector of a substrate inserted into the input slot 11 of slot number No. 4 are input into the input signal lines IN-49 through IN-64.

Signals output from the output signal lines OUT-1 through OUT-16 among the output signal lines OUT-1 through OUT-64 are input into a connector of a substrate inserted into the output slot 12 of slot number No. 1. The connector is any one of the connector 62 of the video output substrate 61, the connector 73 of the audio output substrate 71, the connector 73 of the audio output substrate (UB) 72, the connector 82 of TC output substrate 81 which are shown in FIG. 5, and the connector 52 of the RS-422 substrate 51 which is shown in FIG. 4.

Signals output from the output signal lines OUT-17 through OUT-32 are input into the connector of a substrate inserted into the output slot 12 of slot number No. 2. Signals output from the output signal lines OUT-33 through OUT-48 are input into the connector of a substrate inserted into the output slot 12 of slot number No. 3 . Signals output from the output signal lines OUT-49 through OUT-64 are input into the connector of a substrate inserted into the output slot 12 of slot number No. 4.

Data on the setting result, a command and a status are transmitted and received between the CPU 14 shown in FIG. 3 and the primary station (the primary station 6 in the routing switcher 1A in FIG. 2). Thus, the CPU 14 manages/controls the whole router unit 1. Identification information on the substrate inserted into the relevant slot is also obtained from each of the input slots 11 and output slots 12. The identification information includes ID respectively given to the video input substrate 21, audio input substrate 31, audio input substrate (UB) 32, TC input substrate 41, RS-422 substrate 51, video output substrate 61, audio output substrate 71, audio output substrate (UB) 72 and the TC output substrate 81.

According to an embodiment of the present invention, the CPU 14 executes processing of managing the terminal numbers of the router unit 1 based on a concept of a virtual router. The contents of the processing are explained hereinafter by using FIGS. 7 through 15.

[Assignment of Terminal Number]

First, processing of assigning terminal numbers is explained. The CPU 14 virtually sets four routers called "video router", "audio router", "TC router" and "RS router" each including four input slots 11 and four output slots 12 with respect to four kinds of substrates to input/output four kinds of signals that are the video signal, audio signal, time code, and control signal of RS-422 standard.

Further, terminal numbers are assigned to the four kinds of substrates to input the four kinds of signals, which are the video input substrate 21, audio input substrate 31, audio input substrate (UB) 32, TC input substrate 41 and RS-422 substrate 51 inserted into and removed from the input slot 11 (in which both the audio input substrate 31 and audio input substrate (UB) 32 are the substrates to input the audio signal and therefore regarded as one kind). Those terminal numbers are sequentially assigned in numerical order of slot numbers No. 1 through No. 4 of the input slots 11 with respect to the substrate of each kind (specifically, with respect to each of the four virtual routers). The terminal numbers are treated as valid terminal numbers regarding the input slot 11 of the slot number to which the substrate to input the signal of the relevant kind is inserted, and terminal numbers are treated as invalid terminal numbers regarding the input slot 11 of the slot number to which the substrate to input the signal of the relevant kind is not inserted.

Similarly, terminal numbers are assigned to the four kinds of substrates to output the four kinds of signals, which are the video output substrate 61, audio output substrate 71, audio output substrate (UB) 72, TC output substrate 81 and RS-422 substrate 51 inserted into and removed from the output slot 12, (in which both the audio output substrate 71 and audio output substrate (UB) 72 are the substrates to output the audio signal and therefore regarded as one kind). Those terminal numbers are sequentially assigned in numerical order of slot numbers No. 1 through No. 4 of the output slots 12 with respect to each of the four virtual routers. The terminal numbers are treated as valid terminal numbers regarding the output slot 12 of the slot number to which the substrate to output the signal of the relevant kind is inserted, and the terminal numbers are treated as valid terminal numbers regarding the output slot 12 of the slot number to which the substrate to output the signal of the relevant kind is not inserted.

FIGS. 7 through 11 are diagrams showing the processing of assigning the terminal numbers with respect to a specific example of inserting a substrate into an input slot 11 and output slot 12. In this example, the video input substrates 21 are inserted into the input slots 11 of slot numbers No. 1 and No. 2 respectively, the audio input substrate 31 is inserted into the input slot 11 of slot number No. 3, and the TC input substrate 41 is inserted into the input slot 11 of slot number No. 4 as shown in the upper side of FIG. 7.

Further, the video output substrates 61 are inserted into the output slots 12 of slot numbers No. 1 and No. 2 respectively, the audio output substrate 71 is inserted into the output slot 12 of slot number No. 3, and the TC output substrate 81 is inserted into the output slot 12 of slot number No. 4.

Figure 7:
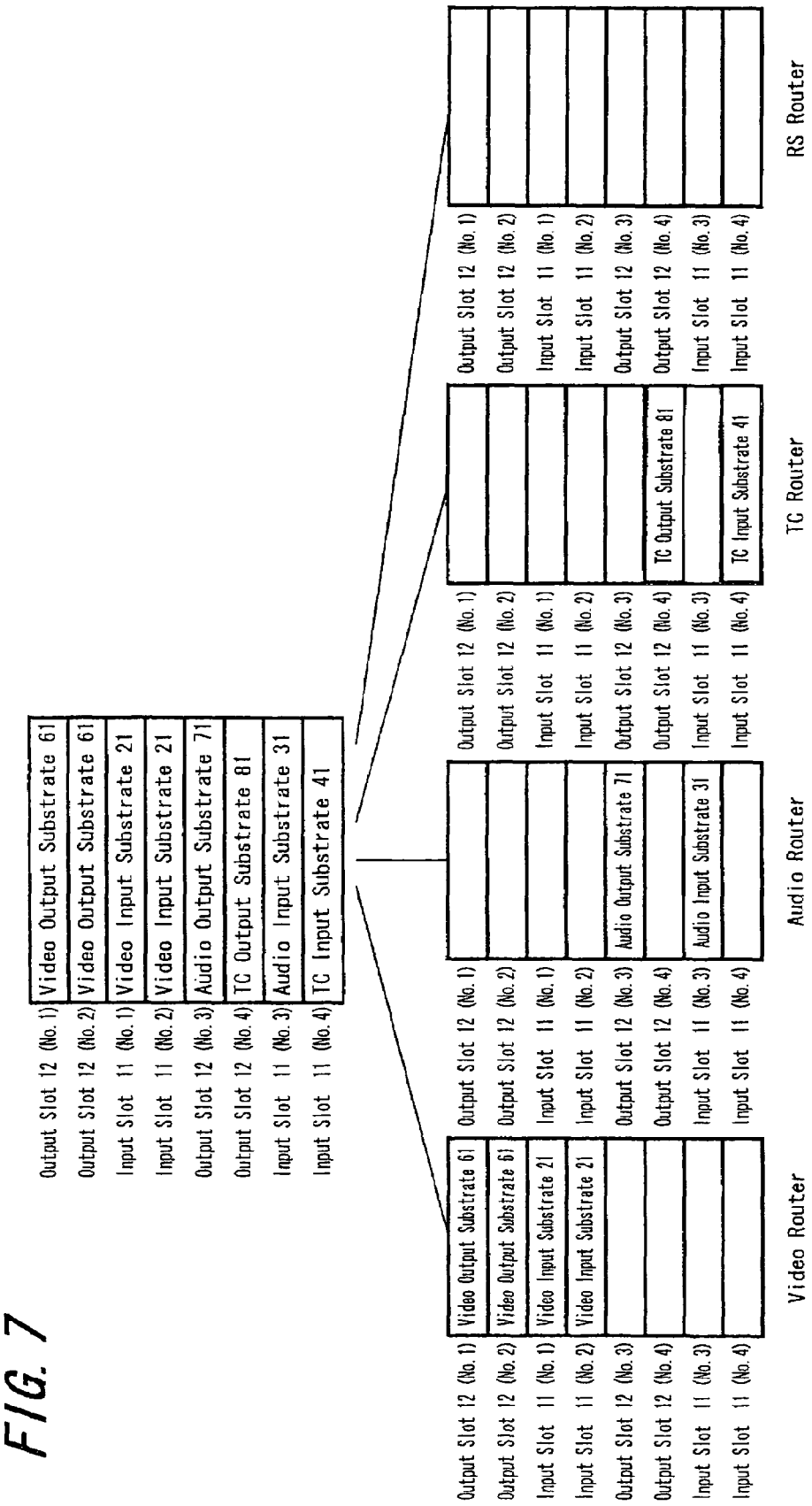
FIG. 7 is a diagram showing an example of terminal-number assigning processing according to an embodiment of the present invention.

As shown in the lower side of FIG. 7, the CPU 14 virtually sets four routers called "video router", "audio router", "TC router" and "RS router" each including four input slots 11 and four output slots 12 with respect to four kinds of signals that are the video signal, audio signal, time code, and control signal of RS-422 standard. Here, the slots where the substrates to input/output the signals of the relevant kinds are practically inserted among the slots of each virtual router are specifically illustrated in the lower side of the figure similarly to the upper side of FIG. 7, however, processing of setting the virtual router is performed independently of the fact that a substrate is inserted into which input slot 11 and output slot 12.

As shown in FIG. 8, terminal numbers with respect to the "video router" are sequentially assigned to the sixteen input terminals 23 of the video input substrates 21 (see FIG. 4) such as 1 through 16, 17 through 32, 33 through 48, and 49 through 64 in order of slot numbers No. 1, No. 2, No. 3 and No. 4 of the input slots 11.

Further, terminal numbers are sequentially assigned to the sixteen output terminals 63 of the video output substrates 61 (see FIG. 5) such as 1 through 16, 17 through 32, 33 through 48, and 49 through 64 in order of slot numbers No. 1, No. 2, No. 3 and No. 4 of the output slots 12.

The minimum terminal number (a first terminal number of each slot) assigned to the input slots 11 and output slots 12 respectively in the "video router" is obtained by the above method of assigning the terminal numbers as shown in the following formula:

$$\text{Minimum Terminal Number } 16\times(N-1)+1$$

where N is a slot number (numeral after "No.").

Further, among the terminal numbers assigned in this manner, the terminal numbers 1 through 32 are treated as valid terminal numbers with respect to the input slots 11 of slot numbers No. 1 and No. 2 where the video input substrates 21 are inserted respectively, and the terminal numbers 33 through 64 are treated as invalid terminal numbers with respect to the input slots 11 of slot numbers No. 3 and No. 4 where the video input substrates 21 are not inserted.

Similarly, the terminal numbers 1 through 32 are treated as valid terminal numbers with respect to the output slots 12 of slot numbers No. 1 and No. 2 where the video output substrates 61 are inserted, and the terminal numbers 33 through 64 are treated as invalid terminal numbers with respect to the output slots 12 of slot numbers No. 3 and No. 4 where the video output substrates 61 are not inserted.

As shown in FIG. 9, terminal numbers with respect to the "audio router" are sequentially assigned to the thirty-two input terminals 34 of the audio input substrate 31 having more input terminals than the audio input substrate (UB) 32 (see FIG. 4), such as 1 through 32, 33 through 64, 65 through 96, and 97 through 128 in order of slot numbers No. 1, No. 2, No. 3 and No. 4 of the input slots 11.

Further, terminal numbers are sequentially assigned to the thirty-two output terminals 74 of the audio output substrate 71 having more output terminals than the audio output substrate (UB) 72 (see FIG. 5) such as 1 through 32, 33 through 64, 65 through 96, and 97 through 128 in order of slot numbers No. 1, No. 2, No. 3 and No. 4 of the output slots 12.

The minimum terminal number assigned to the input slot 11 and output slot 12 of each slot number in the "audio router" is obtained by this method of assigning the terminal numbers as shown in the following formula:

$$\text{Minimum Terminal Number } 32\times(N-1)+1$$

where N is a slot number.

Further, among the terminal numbers assigned in the manner, the terminal numbers 65 through 96 are treated as valid terminal numbers with respect to the input slot 11 of slot number No. 3 where the audio input substrate 31 or the audio input substrate (UB) 32 is inserted, and the terminal numbers 1 through 64 and 97 through 128 are treated as invalid terminal numbers with respect to the input slots 11 of slot numbers No. 1, No. 2 and No. 4 where the audio input substrate 31 or the audio input substrate (UB) 32 is not inserted.

Similarly, the terminal numbers 65 through 96 are treated as valid terminal numbers with respect to the output slot 12 of slot number No. 3 where the audio output substrate 71 or the audio output substrate (UB) 72 is inserted, and the terminal numbers 1 through 64 and 97 through 128 are treated as invalid terminal numbers with respect to the output slots 12 of slot numbers No. 1, No. 2 and No. 4 where the audio output substrate 71 or the audio output substrate (UB) 72 is not inserted.

It should be noted that the audio input substrate (UB) 32 and the audio output substrate (UB) 72 are not inserted in the example of FIG. 7. However, since the input terminals 35 (see FIG. 4) and output terminals 75 (see FIG. 5) of those substrates are sixteen respectively, the terminal numbers of the seventeenth through the thirty-second are treated as vacant numbers with respect to the input slots 11 and output slots 12 of the slot numbers where those substrates are inserted. Similarly, those vacant terminal numbers are the terminal numbers 17 through 32 in case of the input slot 11 and output slot 12 of slot number No. 1, the terminal numbers 49 through 64 in case of the input slot 11 and output slot 12 of slot number No. 2, the terminal numbers 81 through 96 in case of the input slot 11 and output slot 12 of slot number No. 3, and the terminal numbers 113 through 128 in case of the input slot 11 and output slot 12 of slot number No. 4.

As shown in FIG. 10, terminal numbers with respect to the "TC router" are sequentially assigned to the sixteen input terminals 43 of the TC input substrate 41 (see FIG. 4) such as 1 through 16, 17 through 32, 33 through 48, and 49 through 64 in order of slot numbers No. 1, No. 2, No. 3 and No. 4 of the input slots 11.

Further, terminal numbers are sequentially assigned to the sixteen output terminals 83 of the TC output substrate 81 (see FIG. 5) such as 1 through 16, 17 through 32, 33 through 48, and 49 through 64 in order of slot numbers No. 1, No. 2, No. 3 and No. 4 of the output slots 12.

The minimum terminal number assigned to the input slot 11 and output slot 12 of each slot number in the "TC router" is obtained by this method of assigning the terminal numbers as shown in the following formula:

Minimum Terminal Number 16×(N−1)+1 where N is a slot number.

Further, among the terminal numbers assigned in this manner, the terminal numbers 49 through 64 are treated as valid terminal numbers with respect to the input slot 11 of slot number No. 4 where the TC input substrate 41 is inserted, and the terminal numbers 1 through 48 are treated as invalid terminal numbers with respect to the input slots 11 of slot numbers No. 1 through No. 3 where the TC input substrate 41 is not inserted.

Similarly, the terminal numbers 49 through 64 are treated as valid terminal numbers with respect to the output slot 12 of slot number No. 4 where the TC output substrate 81 is inserted, and the terminal numbers 1 through 48 are treated as invalid terminal numbers with respect to the output slots 12 of slot numbers No. 1 through No. 3 where the TC output substrate 81 is not inserted.

As shown in FIG. 11, terminal numbers with respect to the "RS router" are sequentially assigned to the eight input terminals 53 of the RS-422 substrate 51 (see FIG. 4) such as 1 through 8, 9 through 16, 17 through 24, and 25 through 32 in order of slot numbers No. 1, No. 2, No. 3 and No. 4 of the input slots 11. However, the terminal numbers 8, 16, 24 and 32 are here treated as vacant numbers since one terminal among eight input terminals 53 is not used in the RS-422 substrate 51 as described above.

Further, terminal numbers are sequentially assigned to the eight output terminals 53 of the RS-422 substrate 51 such as 1 through 8, 9 through 16, 17 through 24, and 25 through 32 in order of slot numbers No. 1, No. 2, No. 3 and No. 4 of the output slots 12. Here, the terminal numbers 8, 16, 24 and 32 are treated as vacant numbers since one terminal among eight output terminals 53 is also not used in the RS-422 substrate 51.

The minimum terminal number assigned to the input slot 11 and output slot 12 of each slot number in the "TC router" is obtained by the above method of assigning the terminal numbers as shown in the following formula:

Minimum Terminal Number 8×(N−1)+1 wherein N is a slot number and 8×N is a vacant number.

Further, since the RS-422 substrate 51 is not inserted in the example of FIG. 7, the terminal numbers 1 through 32 for the input slots 11 of all the slot numbers No. 1 through No. 4 and the terminal numbers 1 through 32 for the output slots 12 of all the slot numbers No. 1 through No. 4 are treated as invalid terminal numbers.

FIG. 12 is a diagram showing a valid/invalid distinction of the terminal numbers assigned to the "video router" regarding another example of inserting substrates, which is different from FIG. 7. In this example, the video input substrates 21 are inserted into the input slots 11 of slot numbers No. 2, No. 3 and No. 4, respectively. Further, the video output substrates 61 are inserted into the output slots 12 of slot numbers No. 2 and No. 3, respectively. Accordingly, the terminal numbers 17 through 64 with respect to the input slots 11 of slot numbers No. 2 through No. 4 and the terminal numbers 17 through 48 with respect to the output slots 12 of slot numbers No. 2 and No. 3 are treated as valid terminal numbers.

FIG. 13 is a diagram showing a valid/invalid distinction of the terminal numbers assigned to the "audio router" regarding further another example of inserting substrates. In this example, the audio input substrates 31 are inserted into the input slots 11 of slot numbers No. 2 and No. 4, respectively and the audio input substrate (UB) 32 is inserted into the input slot 11 of slot number No. 3. Further, the audio output substrates 71 are inserted into the output slots 12 of slot numbers No. 2 and No. 3, respectively. Accordingly, the terminal numbers 33 through 128 with respect to the input slots 11 of slot numbers No. 2 through No. 4 and the terminal numbers 33 through 96 with respect to the output slots 12 of slot numbers No. 2 and No. 3 are treated as valid terminal numbers. Further, the terminal numbers 81 through 96 among the terminal numbers 65 through 96 with respect to the input slot 11 of slot number No. 3 are treated as vacant numbers.

FIG. 14 is a diagram showing a valid/invalid distinction of the terminal numbers assigned to the "RS router" regarding further another example of inserting substrates. In this example, the RS-422 substrates 51 are inserted into the input slots 11 of slot numbers No. 2 through No. 4 and into the output slots 12 of slot numbers No. 2 and No. 3, respectively. Accordingly, the terminal numbers 9 through 32 (though the terminal numbers 16, 24 and 32 are treated as vacant numbers) with respect to the input slots 11 of slot numbers No. 2 through No. 4 and the terminal numbers 9 through 24 (though the terminal numbers 16 and 24 are treated as vacant numbers) with respect to the output slots 12 of slot numbers No. 2 and No. 3 are treated as valid terminal numbers.

[Unit Location]

"Unit location" is included in items to be set by the terminal computer 4 of FIG. 2. Corresponding to numbers of input/ output terminals of each router (here, the router unit 1 in the routing switcher 1A and the router unit 1 in the routing switcher 1B) in the signal switching system, regions of different terminal numbers are allocated by the unit location in a space where the number of input terminals and the number of output terminals are more than the whole routers.

Each secondary station retains information on the terminal numbers in the space allocated by the unit location and specifies the input/output terminals of each router based on the terminal numbers in the space.

According to an embodiment of the present invention, the terminal computer 4 allocates not only the regions of different terminal numbers in the space corresponding to each router unit 1 in the routing switchers 1A and 1B but also allocates the regions to each of four virtual routers called "video router", "audio router", "TC router" and "RS router" (for each of the four substrates to input/output four kinds of signals that are the video signal, audio signal, time code and control signal of RS-422 standard).

Figure 15:
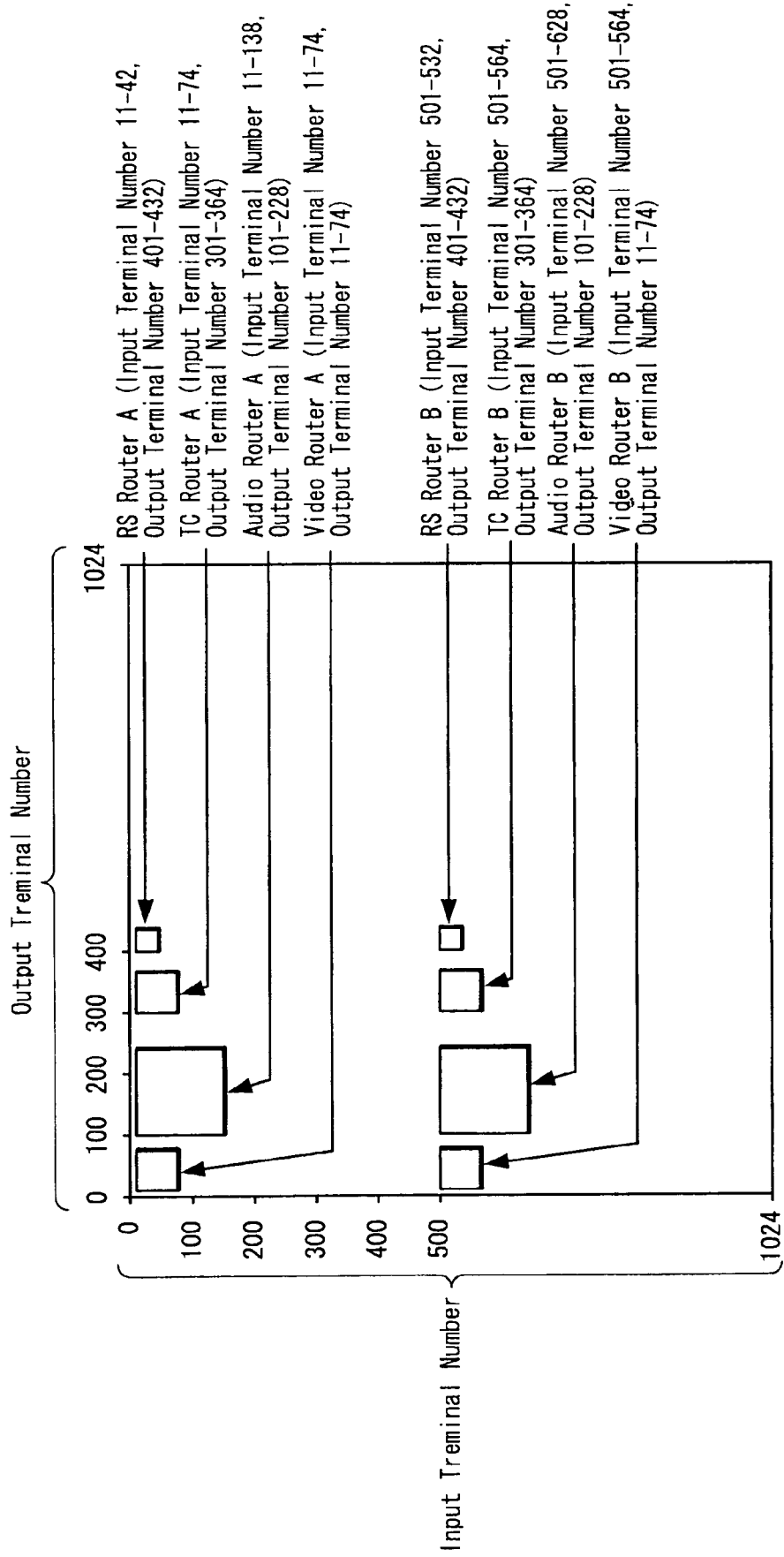
FIG. 15 is a diagram showing an example of a unit location according to an embodiment of the present invention.

FIG. 15 is a diagram showing an example of the unit location. Corresponding to the input terminal numbers 1 through 64 and output terminal numbers 1 through 64 of the "video router" (referred to as "video router A") which are set by the router unit 1 in the routing switcher 1A, a region of input terminal numbers 11 through 74 and output terminal numbers 11 through 74 is allocated in a space of the input terminal number 1,024×output terminal number 1,024. In other words, offset values to both the input terminal number and output terminal number of the "video router A" are 10 in the region of the input terminal numbers 11 through 74 and output terminal numbers 11 through 74 in the space.

Further, a region of input terminal numbers 11 through 138 and output terminal numbers 101 through 228 is allocated in the space, corresponding to the input terminal numbers 1 through 128 and output terminal numbers 1 through 128 of the "audio router" (referred to as "audio router A") which are set by the router unit 1 in the routing switcher 1A. In other words, offset values to the input terminal number and output terminal number of the "audio router A" are 10 and 100 respectively in the region of the input terminal numbers 11 through 138 and output terminal numbers 101 through 228 in the space.

Further, a region of input terminal numbers 11 through 74 and output terminal numbers 301 through 364 is allocated in the space, corresponding to the input terminal numbers 1 through 64 and output terminal numbers 1 through 64 of the "TC router" (referred to as "TC router A") which are set by the router unit 1 in the routing switcher 1A. In other words, offset values to the input terminal number and output terminal number of the "TC router A" are 10 and 300 respectively in the region of the input terminal numbers 11 through 74 and output terminal numbers 301 through 364 in the space.

Further, a region of input terminal numbers 11 through 42 and output terminal numbers 401 through 432 is allocated in the space, corresponding to the input terminal numbers 1 through 32 and output terminal numbers 1 through 32 (terminal numbers 8, 16, 24 and 32 are vacant numbers) of the "RS router" (referred to as "RS router A") which are set by the router unit 1 in the routing switcher 1A. In other words, offset values to the input terminal number and output terminal number of the "RS router A" are 10 and 400 respectively in the region of the input terminal numbers 11 through 42 and output terminal numbers 401 through 432 in the space.

On the other hand, a region of input terminal numbers 501 through 564 and output terminal numbers 11 through 74 is allocated in the space, corresponding to the input terminal numbers 1 through 64 and output terminal numbers 1 through 64 of the "video router" (referred to as "video router B") which are set by the router units 1 in the routing switcher 1B. In other words, offset values to the input terminal number and output terminal number of the "video router B" are 500 and 10 respectively in the region of the input terminal numbers 501 through 564 and output terminal numbers 11 through 74 in the space.

Further, a region of input terminal numbers 501 through 628 and output terminal numbers 101 through 228 is allocated in the space, corresponding to the input terminal numbers 1 through 128 and output terminal numbers 1 through 128 of the "audio router" (referred to as "audio router B") which are set by the router unit 1 in the routing switcher 1B. In other words, offset values to the input terminal number and output terminal number of the "audio router B" are 500 and 100 respectively in the region of the input terminal numbers 501 through 628 and output terminal numbers 101 through 228 in the space.

Further, a region of input terminal numbers 501 through 564 and output terminal numbers 301 through 364 is allocated in the space, corresponding to the input terminal numbers 1 through 64 and output terminal numbers 1 through 64 of the "TC router" (referred to as "TC router B") which are set by the router unit 1 in the routing switcher 1B. In other words, offset values to the input terminal number and output terminal number of the "TC router B" are 500 and 300 respectively in the region of the input terminal numbers 501 through 564 and output terminal numbers 301 through 364 in the space.

Further, a region of input terminal numbers 501 through 532 and output terminal numbers 401 through 432 is allocated in the space, corresponding to the input terminal numbers 1 through 32 and output terminal numbers 1 through 32 (terminal numbers 8, 16, 24 and 32 are vacant numbers) of the "RS router" (referred to as "RS router B") which are set by the router unit 1 in the routing switcher 1B. In other words, offset values to the input terminal number and output terminal number of the "RS router B" are 500 and 400 respectively in the region of the input terminal numbers 501 through 532 and output terminal numbers 401 through 432 in the space.

Thus, different regions are allocated for terminal numbers in the space of the input terminal number 1,024×output terminal number 1,024 with respect to each of the four virtual routers called "video router", "audio router", "TC router" and "RS router". Further, data on the setting result of the unit location is sent from the terminal computer 4 to each of the router unit 1, control panel 2 and tally panels 3A and 3B of the secondary stations through the primary stations.

Each secondary station retains the data on the setting result in an internal memory. Further, when an operation to switch a connection relation between the input terminal and output terminal of the router unit 1 is performed on the control panel 2, for example, a switch command specifying the input terminal and output terminal with the terminal numbers set by the unit location is sent from the control panel 2 to the router unit 1 through the primary stations.

[Execution of Command]

The CPU 14 receives the switch command specifying the input terminal and the output terminal with the terminal numbers set by the unit location as described above. Then, the CPU 14 in the router unit 1 converts the specified terminal numbers into the terminal numbers of the input terminal and output terminal of the virtual router of the kind corresponding to the region in the space of the input terminal number 1,024× the output terminal number 1,024 including the terminal numbers by using the data on the setting result of unit location which is retained in the internal memory.

The router unit 1 in the routing switcher 1A receives a switch command respectively specifying an input terminal and an output terminal with terminal numbers 11 and 50 set by the unit location, for example. Then, the CPU 14 of the router unit 1 subtracts the offset values (offset values of 10 and 10 with respect to the region of the input terminal numbers 11 through 74 and output terminal numbers 11 through 74 (FIG. 15) which is the region in the space including the terminal numbers 11 and 50) from those terminal numbers 11 and 50. Accordingly, the terminal numbers are converted respectively into the terminal numbers 1 and 40 of the input terminal and output terminal of the "video router A".

Furthermore, the router unit 1 in the routing switcher 1A receives a switch command respectively specifying an input terminal and an output terminal with terminal numbers 11 and 106 set by the unit location, for example. Then, the CPU 14 of the router unit 1 subtracts the offset values (offset values of 10 and 100 with respect to the region of the input terminal numbers 11 through 138 and output terminal numbers 101 through 228 (FIG. 15) which is the region in the space including the terminal numbers 11 and 106) from the terminal numbers 11 and 106. Accordingly, the terminal numbers are converted respectively into the terminal numbers 1 and 6 of the input terminal and output terminal of the "audio router".

The CPU 14 judges whether terminal numbers of input terminals and output terminals of the virtual router thus converted are treated as valid terminal numbers and also judges whether those terminal numbers are treated as vacant numbers by the above-described [Assignment of Terminal Number].

Further, only in the case where it is judged that those terminal numbers are treated as valid terminal numbers and are not treated as vacant numbers, the connection relation of the input terminal and output terminal is switched by the matrix switch circuit 13 (see FIG. 3) in accordance with a received switch command.

For example, it is assumed that the terminal numbers converted based on a switch command are the terminal numbers 1 and 40 of the input terminal and output terminal of the "video router" and also assumed that the substrates are inserted into the input slot 11 and the output slot 12 as shown in the above-described example of FIG. 7. In that case, the terminal number 1 with respect to the input slot 11 among the terminal numbers of the "video router" is a valid terminal number but the terminal number 40 with respect to the output slot 12 is an invalid terminal number as shown in FIG. 8, and therefore the received switch command is not executed.

Further, it is assumed that the terminal numbers converted based on a switch command are the terminal numbers 65 and 76 of the input terminal and output terminal of the "audio router" and also assumed that the substrates are inserted into the input slot 11 and the output slot 12 as shown in the above-described example of FIG. 7, for example. In that case, the terminal number 65 with respect to the input slot 11 and the terminal number 76 with respect to the output slot 12 in the "audio router" are valid terminal numbers and are not vacant numbers as shown in FIG. 9, and therefore the received switch command is executed.

Further, it is assumed that the terminal numbers converted based on a switch command are the terminal numbers 91 and 40 of the input terminal and output terminal of the "audio router" and the substrates are inserted into the input slot 11 and the output slot 12 as shown in the above-described example of FIG. 13, for example. In that case, the terminal number 40 with respect to the output slot 12 among the terminal numbers of the "audio router" is a valid terminal number but the terminal number 91 with respect to the input slot 11 is a vacant number, and therefore the received switch command is not executed.

As described above, terminal numbers are sequentially assigned to input terminals and output terminals in numerical order of input slots 11 and output slots 12 for each of substrates differing in the kind of signal to input/output (each of four virtual routers called "video router", "audio router", "TC router", and "RS router"). Then, only the terminal numbers with respect to the slot where the relevant kind of substrate is inserted are treated as the valid terminal numbers in the router 1.

In the case where a substrate inserted into a certain slot is replaced with another kind of substrate, terminal numbers remain unchanged but only the status of valid/invalid of the terminal numbers changes in those virtual routers. Therefore, there is no change in terminal numbers caused by the exchange of substrates in the router 1.

Further, in the router 1 is retained corresponding to respective virtual routers the information indicating regions for different terminal numbers in a space (unit location space) where the number of input terminals and the number of output terminals are more than those of the whole router 1. Therefore, no terminal numbers of each virtual router mutually overlap in the space.

Further, based on receiving the command specifying the input signal and the output signal by the terminal numbers in the space, those specified terminal numbers are converted into the terminal numbers of the virtual router corresponding to the region including the relevant terminal numbers by using the information. Then, the processing in accordance with the command is executed only in the case where those converted terminal numbers are treated as the valid terminal numbers in the virtual router (more specifically, only in the case where those converted terminal numbers are the terminal numbers with respect to the slot where the relevant kind of substrate in the virtual router is inserted).

In this way, terminal numbers are managed as the whole router 1 without being affected by the exchange of substrates and an input signal originally intended to output to a certain device can be output to the intended device.

Furthermore, in the router 1 are used the substrates differing in the number of terminals such as the audio input substrate 31, audio input substrate (UB) 32, audio output substrate 71 and audio output substrate (UB) 72 as the substrates to input/output the same kind of signal that is an audio signal. Here, terminal numbers of the "audio router" are assigned based on the number of terminals of the audio input substrate 31 and the audio output substrate 71, which are substrates of the largest number of terminals. In addition, terminal numbers regarding a portion which is short in the number of terminals are treated as vacant numbers with respect to the audio input substrate (UB) 32 and the audio output substrate (UB) 72 including less number of terminals.

Further, the command is not executed in the case where the terminal number converted from the terminal number specified by the received command is treated as the vacant number in the "audio router".

Thus, terminal numbers can be managed by the "audio router" in a unified way, even though the substrates differing in the number of terminals such as the audio input substrate 31, audio input substrate (UB) 32, audio output substrate 71 and audio output substrate (UB) 72 are used as the substrates to input/output the same kind of signal that is an audio signal.

Further, although the terminal numbers 8, 16, 24 and 32 corresponding to the unused input/output terminals of the RS-422 substrate 51 are vacant numbers with respect to the "RS router", management of the terminal numbers of the "RS router" can be unified in a similar manner to the "audio router" even if an RS-422 substrate without an unused input/output terminal is used in combination with the RS-422 substrate 51.

In the embodiments heretofore described, the substrates differing in the number of terminals such as the audio input substrate 31, audio input substrate (UB) 32, audio output substrate 71 and audio output substrate (UB) 72 are used as the substrates to input/output the same kind of signal that is an audio signal. Further, the concept of a vacant number is introduced to the terminal numbers of the virtual router, corresponding to the existence of an unused input/output terminal in the RS-422 substrate 51. However, terminal numbers of the virtual router may be distinguished only by the status of valid/invalid without introducing the concept of vacant numbers in the case where only substrates including the same number of terminals are used as the substrates to input/output the same kind of signal and there is no unused input/output terminals in the substrates.

Moreover, in the embodiments heretofore described, it is explained that the matrix switch circuit 13 in FIG. 3 includes sixty-four input signal lines and the sixty-four output signal lines intersected on the single substrate. However, a matrix switch circuit of a router may include two or more matrix substrates (four substrates each including thirty-two input signal lines×thirty-two output signal lines, for example) and a selection of matrix substrates to be mounted is an option (at least one substrate is used). In such case, it is judged in the processing of the above-described [Execution of Command] whether the terminal numbers of the input terminal and output terminal of the virtual router converted from the switch command are treated as the valid terminal numbers and whether those terminal numbers are treated as the vacant numbers. Further, it is judged whether the matrix substrate corresponding to the terminal numbers is mounted on the matrix switch circuit 13. Then, the switch command can be executed only in the case where all the conditions of being valid, being not a vacant number, and including a matrix circuit mounted are satisfied.

Further, in the above-described embodiments, the present invention is applied to the router to input/output four kinds of signals of the video signal, audio signal, time code, and control signal of RS-422 standard. However, it should be appreciated that an embodiment of the present invention may be a router to input/output part of the four kinds of signals (for example, only three kinds of signals such as the video signal, audio signal and time code) and a router to input/output a different kind of signal from those signals (for example, a control signal of other communication standard than the RS-422).

Also, the above-described embodiment of the present invention is applied to a router. However, similarly to the above, the embodiment of the present invention can also be applied to a signal input and/or signal output system other than a router. An embodiment is applied to other systems having a plurality of input slots and/or output slots, in which two or more kinds of signal input substrates differing in the number of input terminals and/or two or more kinds of signal output substrates differing in the number of output terminals can be inserted into and removed from each input slot and/or output slot.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing system including a plurality of input slots and/or output slots, capable of two or more kinds of signal input substrates differing in the number of input terminals and/or two or more kinds of signal output substrates differing in the number of output terminals being inserted into and removed from each of said input slots and/or output slots, comprising:

a first processing unit that sequentially assigns terminal numbers to said input terminals and/or output terminals in numerical order of said input slots and/or output slots for said signal input substrates and/or signal output substrates of each kind, and that treats the terminal numbers as valid terminal numbers regarding said input slot and/or output slot where the relevant kind of the substrate is inserted and treats the terminal numbers as invalid terminal numbers regarding said input slot and/or output slot where the relevant kind of substrate is not inserted;

a second processing unit that retains information indicating regions of different terminal numbers in a space where the number of input terminals and/or the number of output terminals are more than those of the whole system, corresponding to said signal input substrate and/or signal output substrate of each kind; and a third processing unit that upon receiving a command specifying an input signal and/or output signal by the terminal numbers in said space and using said information retained in said second processing unit, converts the specified terminal numbers into the terminal numbers of said input terminal and/or output terminal in said signal input substrate and/or signal output substrate of the kind corresponding to the region including the relevant terminal number and that judges whether the converted terminal numbers are treated as the valid terminal numbers by said first processing unit, wherein processing corresponding to said command is executed only in the case where it is judged that the converted terminal numbers are treated as the valid terminal numbers by said third processing unit.

2. A signal processing system according to claim 1, wherein said two or more kinds of signal input substrates and/or signal output substrates are those differing in the kind of input signal and/or output signal;

said first processing unit assigns terminal numbers based on the number of terminals in a substrate including the largest number of terminals and treats terminal numbers of a portion being short in the number of terminals as vacant numbers regarding a substrate including less number of terminals, in the case where signal input substrates and/or signal output substrates differing in the number of terminals exist as said signal input substrates and/or signal output substrates of the same kind, said third processing unit judges whether said converted terminal numbers are treated as the valid terminal numbers by said first processing unit and judges whether those converted terminal numbers are treated as the vacant numbers, and processing in accordance with said command is executed only in the case where it is judged by said third processing unit that those converted terminal numbers are treated as the valid terminal numbers and are not treated as the vacant numbers.

3. A method of managing terminal numbers in a signal processing system including a plurality of input slots and/or output slots, capable of two or more kinds of signal input substrates differing in the number of input terminals and/or two or more kinds of signal output substrates differing in the number of output terminals being inserted into and removed from each of said input slots and/or output slots, comprising:

a first step of sequentially assigning terminal numbers to said input terminals and/or output terminals in numerical order of said input slots and/or output slots for said signal input substrates and/or signal output substrates of each kind, and treating terminal numbers as valid terminal numbers regarding said input slot and/or output slot where the relevant kind of the substrate is inserted and treating terminal numbers as invalid terminal numbers regarding said input slot and/or output slot where the relevant kind of substrate is not inserted;

a second step of retaining information indicating regions of different terminal numbers in a space where the number of input terminals and/or the number of output terminals are more than those of the whole system, corresponding to said signal input substrate and/or signal output substrate of each kind;

a third step of upon receiving a command specifying an input signal and/or output signal by terminal numbers in said space and using said information retained at said second step, converting the specified terminal numbers into the terminal numbers of said input terminal and/or output terminal in said signal input substrate and/or signal output substrate of the kind corresponding to the region including the relevant terminal numbers, and judging whether the converted terminal numbers are treated as the valid terminal numbers at said first step; and a fourth step of executing processing in accordance with said command only in the case where it is judged that the converted terminal numbers are treated as the valid terminal numbers at said third step.

4. A routing switcher including a plurality of input slots and output slots respectively, capable of two or more kinds of signal input substrates differing in the kind of input signal and differing in the number of input terminals and two or more kinds of signal output substrates differing in the kind of output signal and differing in the number of output terminals respectively being inserted into and removed from each of said input slots and output slots, comprising:

first processing means for sequentially assigning terminal numbers to said signal input substrates of each kind in numerical order of said input slots and performing processing of treating the terminal numbers as valid terminal numbers regarding said input slot where the relevant kind of signal input substrate is inserted and processing of treating the terminal numbers as invalid terminal numbers regarding said slot where the relevant kind of signal input substrate is not inserted, and for sequentially assigning terminal numbers to said signal output substrates of each kind in numerical order of said output slots and performing processing of treating the terminal number as valid terminal numbers regarding said output slot where the relevant kind of signal output substrate is inserted and processing of treating the terminal numbers as invalid terminal numbers regarding said slot where the relevant kind of signal output substrate is not inserted;

second processing means for retaining information indicating regions of different terminal numbers in a space where the number of input terminals and the number of output terminals are more than those of the whole routing switcher, corresponding to said signal input substrate and signal output substrate of each kind; and third processing means for upon receiving a command specifying an input signal and output signal by the terminal numbers in said space and using said information retained in said second processing means, converting the specified terminal numbers respectively into the terminal numbers of said input terminal and output terminal in said signal input substrate and signal output substrate of the kind corresponding to the region including the relevant terminal numbers, and for judging whether the converted terminal numbers are treated as the valid terminal numbers by said first processing means, wherein processing corresponding to said command is executed only in the case where it is judged that the converted terminal numbers are treated as the valid terminal numbers by said third processing means.

5. A routing switcher according to claim 4, wherein said first processing means assigns terminal numbers based on the number of terminals in a substrate including the largest number of terminals and treats terminal numbers of a portion being short in the number of terminals as vacant numbers regarding a substrate including less number of terminals, in the case where substrates differing in the number of terminals exist as said signal input substrates and signal output substrates of the same kind, said third processing means judges whether said converted terminal numbers are treated as the valid terminal numbers by said first processing means and judges whether those converted terminal numbers are treated as the vacant numbers, and processing in accordance with said command is executed only in the case where it is judged by said third processing means that those converted terminal numbers are treated as the valid terminal numbers and are not treated as the vacant numbers.

6. A method of managing terminal numbers in a routing switcher including a plurality of input slots and output slots respectively, capable of two or more kinds of signal input substrates differing in the kind of input signal and differing in the number of input terminals and two or more kinds of signal output substrates differing in the kind of output signal and differing in the number of output terminals respectively being inserted into and removed from each of said input slots and output slots, comprising:

a first step of sequentially assigning terminal numbers to each of said signal input substrates in numerical order of said input slots and performing processing of treating terminal numbers as valid terminal numbers regarding said input slot where the relevant kind of signal input substrate is inserted and of treating terminal numbers as invalid terminal numbers regarding said slot where the relevant kind of signal input substrate is not inserted, and sequentially assigning terminal numbers to each of said signal output substrates in numerical order of said output slots and performing processing of treating terminal numbers as valid terminal numbers regarding said output slot where the relevant kind of signal output substrate is inserted and of treating terminal numbers as invalid terminal numbers regarding said slot where the relevant kind of signal output substrate is not inserted;

a second step of retaining information indicating regions of different terminal numbers in a space where the number of input terminals and the number of output terminals are more than those of the whole routing switcher, corresponding to said signal input substrate and signal output substrate of each kind;

a third step of upon receiving a command specifying an input signal and output signal by terminal numbers in said space and using said information retained at said second step, converting the specified terminal numbers respectively into the terminal numbers of said input terminal and output terminal in said signal input substrate and signal output substrate of the kind corresponding to the region including the relevant terminal numbers, and judging whether the converted terminal numbers are treated as the valid terminal numbers at said first step; and a fourth step of executing processing in accordance with said command only in the case where it is judged that the converted terminal numbers are treated as the valid terminal numbers at said third step.

7. A routing switcher including a plurality of input slots and output slots respectively, capable of two or more kinds of signal input substrates differing in the kind of input signal and differing in the number of input terminals and capable of two or more kinds of signal output substrates differing in the kind of output signal and differing in the number of output terminals respectively being inserted into and removed from each of said input slots and output slots, comprising:

a first processing unit that sequentially assigns terminal numbers to said signal input substrates of each kind in numerical order of said input slots and performs processing of treating the terminal numbers as valid terminal numbers regarding said input slot where the relevant kind of signal input substrate is inserted and processing of treating the terminal numbers as invalid terminal numbers regarding said slot where the relevant kind of signal input substrate is not inserted, and that sequentially assigns terminal numbers to said signal output substrates of each kind in numerical order of said output slots and performs processing of treating the terminal number as valid terminal numbers regarding said output slot where the relevant kind of signal output substrate is inserted and of treating the terminal numbers as invalid terminal numbers regarding said slot where the relevant kind of signal output substrate is not inserted;

a second processing unit that retains information indicating regions of different terminal numbers in a space where the number of input terminals and the number of output terminals are more than those of the whole routing switcher, corresponding to said signal input substrate and signal output substrate of each kind; and a third processing unit that upon receiving a command specifying an input signal and output signal by the terminal numbers in said space and using said information retained in said second processing unit, converts the specified terminal numbers respectively into the terminal numbers of said input terminal and output terminal in said signal input substrate and signal output substrate of the kind corresponding to the region including the relevant terminal numbers, and that judges whether the relevant converted terminal numbers are treated as the valid terminal numbers by said first processing unit, wherein processing corresponding to said command is executed only in the case where it is judged that the converted terminal numbers are treated as the valid terminal numbers by said third processing unit.

* * * * *